US008719782B2

(12) United States Patent  
DeHaan (10) Patent No.: US 8,719,782 B2
(45) Date of Patent: May 6, 2014

(54) INTEGRATED PACKAGE DEVELOPMENT AND MACHINE CONFIGURATION MANAGEMENT

(75) Inventor: Michael Paul DeHaan, Morrisville, NC (US)

(73) Assignee: Red Hat, Inc., Raleigh, NC (US)

(*) Notice: Subject to any disclaimer, the term of this patent is extended or adjusted under 35 U.S.C. 154(b) by 789 days.

(21) Appl. No.: 12/608,566

(22) Filed: Oct. 29, 2009

(65) Prior Publication Data

US 2011/0107299 A1    May 5, 2011

(51) Int. Cl.
*G06F 9/44*    (2006.01)

(52) U.S. Cl.
USPC .......................................... 717/121; 713/100

(58) Field of Classification Search
None
See application file for complete search history.

(56) References Cited

U.S. PATENT DOCUMENTS

| | | | |
|---|---|---|---|
| 5,845,295 A * | 12/1998 | Houseman et al. ................ 1/1 |
| 6,006,034 A * | 12/1999 | Heath et al. ................ 717/170 |
| 6,154,128 A | 11/2000 | Wookey et al. |
| 6,263,455 B1 | 7/2001 | Bannister |
| 6,327,677 B1 | 12/2001 | Garg et al. |
| 6,529,784 B1 | 3/2003 | Cantos et al. |
| 6,611,869 B1 | 8/2003 | Eschelbeck et al. |
| 6,636,521 B1 | 10/2003 | Giulianelli |
| 6,721,880 B1 | 4/2004 | Pike |
| 6,915,457 B1 | 7/2005 | Miller |
| 7,373,553 B2 | 5/2008 | Tripp et al. |
| 7,441,021 B1 | 10/2008 | Perry |
| 7,660,824 B2 | 2/2010 | Halpern et al. |
| 7,693,966 B2 | 4/2010 | Schmid |
| 7,769,990 B1 | 8/2010 | Okcu et al. |
| 7,856,496 B2 | 12/2010 | Kline |
| 7,865,578 B1 | 1/2011 | Gerraty |
| 8,001,083 B1 * | 8/2011 | Offer ................ 707/636 |
| 8,074,214 B2 * | 12/2011 | Isaacson et al. ................ 717/173 |
| 2002/0184349 A1 | 12/2002 | Manukyan |
| 2003/0055931 A1 | 3/2003 | Cravo De Almeida et al. |
| 2003/0061323 A1 | 3/2003 | East et al. |
| 2003/0120754 A1 | 6/2003 | Muto et al. |
| 2003/0177412 A1 | 9/2003 | Todd |
| 2003/0208589 A1 | 11/2003 | Yamamoto |
| 2004/0006546 A1 | 1/2004 | Wedlake et al. |
| 2004/0032625 A1 | 2/2004 | Yamano |
| 2004/0034577 A1 | 2/2004 | Van Hoose et al. |
| 2004/0198319 A1 | 10/2004 | Whelan et al. |
| 2004/0230828 A1 | 11/2004 | DeFuria et al. |
| 2004/0261070 A1 * | 12/2004 | Miller et al. ................ 717/170 |
| 2005/0066218 A1 | 3/2005 | Stachura et al. |
| 2005/0086654 A1 * | 4/2005 | Sumi et al. ................ 717/171 |
| 2005/0198196 A1 | 9/2005 | Bohn et al. |
| 2006/0004806 A1 | 1/2006 | Kraft |

(Continued)

*Primary Examiner* — Elias Mamo
(74) *Attorney, Agent, or Firm* — Lowenstein Sandler LLP (57) ABSTRACT

Embodiments relate to systems and methods for integrated package development and machine configuration management. In aspects, a stage management engine can be invoked by a developer to initiate the development, testing, and deployment of a software package, e.g. an application or operating system. A set of repositories can store related versions of the software under development at different stages of building, testing, and deployment. The repositories can enforce consistent file naming and avoid duplication of stored files. In embodiments, the stage management engine can likewise interface with a configuration management database that stores and manages a resource configuration state of a host virtual machine used to develop and run the subject software package. Both the package and virtual machine bed can be moved through various development stages to production in coordinated fashion, ensuring consistency in both the software to be installed and the target machine for the installation.

20 Claims, 4 Drawing Sheets

(56) References Cited

U.S. PATENT DOCUMENTS

| | | |
|---|---|---|
| 2006/0031188 A1 | 2/2006 | Lara et al. |
| 2006/0050862 A1 | 3/2006 | Shen et al. |
| 2006/0075294 A1 | 4/2006 | Ma et al. |
| 2006/0161444 A1 | 7/2006 | Lubrecht et al. |
| 2007/0005661 A1 | 1/2007 | Yang |
| 2007/0027936 A1 | 2/2007 | Stakutis et al. |
| 2007/0038679 A1 | 2/2007 | Ramkumar et al. |
| 2007/0074077 A1 | 3/2007 | Markow et al. |
| 2007/0121527 A1 | 5/2007 | Zhou et al. |
| 2007/0266124 A1 | 11/2007 | Kinyon et al. |
| 2007/0288530 A1 | 12/2007 | Romem et al. |
| 2008/0016186 A1 | 1/2008 | Ball |
| 2008/0091466 A1 | 4/2008 | Butler et al. |
| 2008/0109542 A1* | 5/2008 | Ferri et al. .................. 709/222 |
| 2008/0209033 A1 | 8/2008 | Ginter et al. |
| 2008/0219563 A1 | 9/2008 | Moroney |
| 2008/0244047 A1 | 10/2008 | Yeung et al. |
| 2008/0295090 A1* | 11/2008 | Bestle et al. .................. 717/170 |
| 2009/0070442 A1 | 3/2009 | Kacin et al. |
| 2009/0132698 A1 | 5/2009 | Barnhill, Jr. |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1 | 12/2009 | DeHaan et al. |
| 2010/0077076 A1 | 3/2010 | Wada |
| 2010/0088197 A1 | 4/2010 | DeHaan et al. |
| 2010/0131625 A1 | 5/2010 | DeHaan |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0223274 A1 | 9/2010 | DeHaan |
| 2010/0223375 A1 | 9/2010 | DeHaan |
| 2010/0275064 A1 | 10/2010 | DeCusatis et al. |
| 2010/0306334 A1 | 12/2010 | DeHaan |
| 2010/0306347 A1 | 12/2010 | DeHaan |
| 2010/0306359 A1 | 12/2010 | DeHaan |
| 2011/0047414 A1 | 2/2011 | Kudo et al. |
| 2011/0055361 A1 | 3/2011 | DeHaan |
| 2011/0055636 A1 | 3/2011 | DeHaan |
| 2011/0055669 A1 | 3/2011 | DeHaan |
| 2011/0055810 A1 | 3/2011 | DeHaan |
| 2011/0078301 A1 | 3/2011 | DeHaan |

* cited by examiner

INTEGRATED PACKAGE DEVELOPMENT AND MACHINE CONFIGURATION MANAGEMENT

FIELD

The present teachings relate to systems and methods for integrated package development and machine configuration management, and more particularly to platforms and techniques for integrating the production process for virtual machines and associated software packages, including virtual machine configuration management and promotion of virtual machines and/or packages through various stages of production.

BACKGROUND

Production management platforms for the development, debugging and deployment of software packages are known. For instance, software developers can utilize package management platforms which permit a developer to code, test, debug, iterate and deploy a software application or an undated version of a software application, operating system, or other software types. In general, at different stages of development the developer can complete and store various versions of the software in different repositories, such as network-accessible databases. The set of repositories can be named or labeled according to the various stages of development stored in that storage location, such as "Beta," "Test", "Stable," "Quality Assurance (QA)," or "Production."

Existing package management platforms and related development tools suffer from a number of operational or technical drawbacks, however. For one, in existing package management platforms the developer or other user may be required to reinstall a given set of resources to a virtual machine when a new stage is entered, for instance to ensure compatibility with a new application or operating system. For another, the developer or other user may be required to manually store different versions of the software as is progresses through various stages of the development life cycle, which can among other things create a risk of inconsistent versions. For still another drawback, existing platforms are configured to manage the development of individual packages, but not the overall configuration management of the virtual machine, itself. Thus, to configure or update the processor, storage, or other resources assigned to a virtual machine functioning as a test bed for the software package under development, the developer or other user may need to invoke a separate configuration management tool to track the resource settings of and updates to the underlying virtual machine. It may be desirable to provide systems and methods for integrated package development and machine configuration management, in which both software packages and machine configurations can be generated, tracked, and moved through all phases of the development cycle using an integrated development tool.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for integrated package development and machine configuration management. More particularly, aspects relate to platforms and techniques for initiating and managing the development of software package versions throughout the software development cycle, including stages or phases such as beta or other testing stages, stable stages, quality assurance stages, and production stages, among other possible stages. According to aspects, a package management tool hosted in a management server can permit a systems administrator or other user to track, store, and migrate the various package versions through the various development stages, which in aspects can be user-defined. The package management tool can store the package versions to corresponding repositories, which can comprise network-accessible databases for systems administrators, programmers, developers, end users, and/or other users to access those software versions for testing, download, and/or installation. In embodiments, software packages produced under management of the package management tool can be designed or intended for installation to a set of virtual machines, as the targets of that installation. In embodiments, the machines to which installation will be directed can in addition or instead include physical machines or other hardware.

In embodiments, in addition to a package management tool, the management server can host, contain, and/or access a configuration management tool or other logic to track, store, and manage the configuration management profile(s) of the virtual machines, that may be used as test beds or hosts for corresponding versions of the software package under development. In aspects, the management server can provide an integrated user interface, an integrated file system including an integrated file naming system, and/or other comprehensive resources used to develop packages in concert with target virtual machines for the compatible installation of those packages, all from the same view, server, interface, tool, or site. These and other embodiments described herein address the various noted shortcomings in known package management and virtual machine management technology, and provide a user or network operator with enhanced power, flexibility, and integration in the software development and distribution process.

Reference will now be made in detail to exemplary embodiments of the present teachings, which are illustrated in the accompanying drawings. Where possible the same reference numbers will be used throughout the drawings to refer to the same or like parts.

Figure 1:
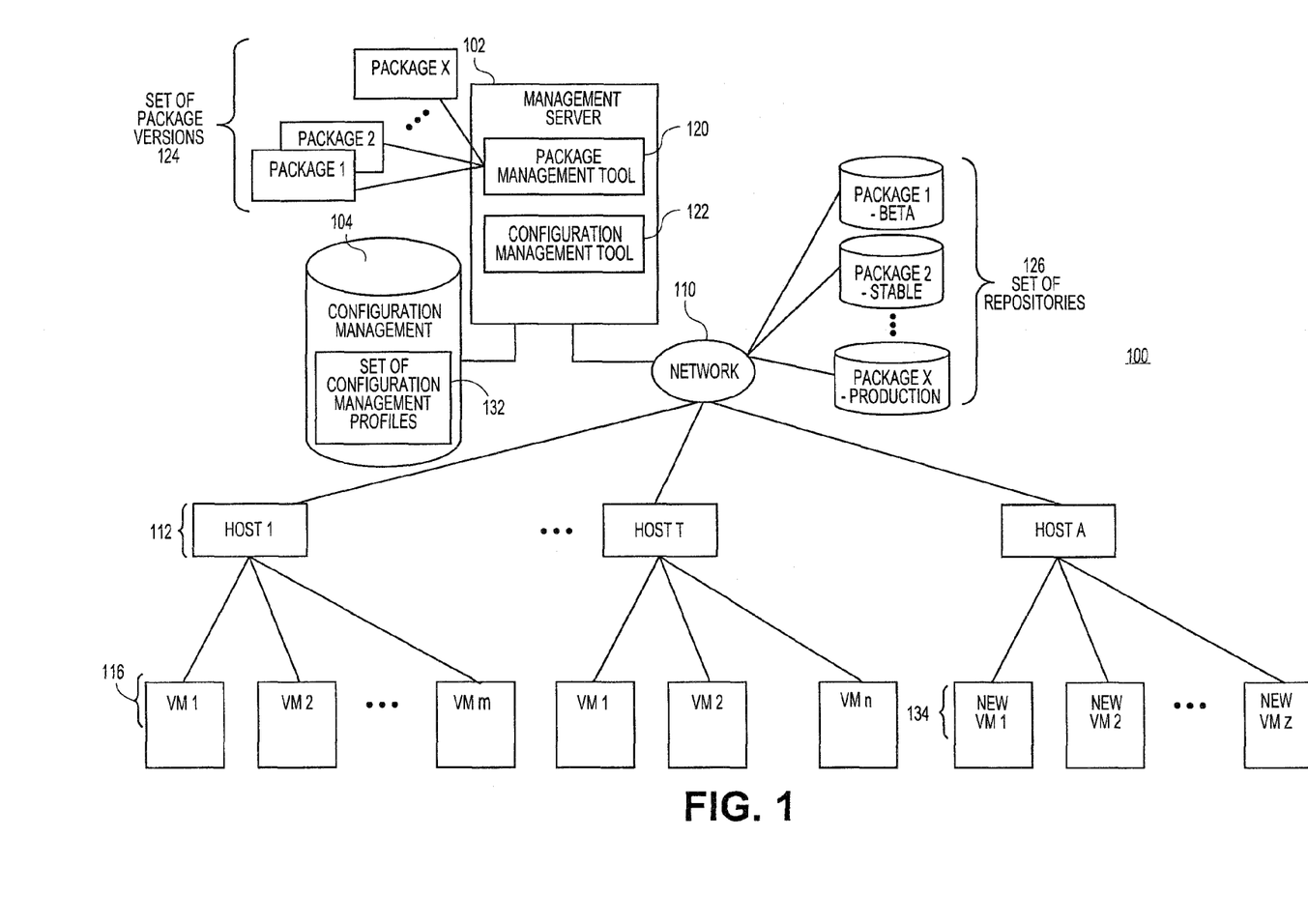
FIG. 1 illustrates an overall network in which systems and methods for integrated package development and machine configuration management can be implemented, according to various embodiments.

FIG. 1 illustrates an overall network 100 in which systems and methods for integrated package development and machine configuration management can be implemented, according to various embodiments of the present teachings. In embodiments as shown, a management server 102 can communicate with a managed network 110 to carry out various software development, testing, configuration management, deployment, maintenance, or other services. In embodiments, management server 102 can communicate with managed network 110 via secure or non-secure channels or connections, including, for instance, the Internet or other public or private networks. In embodiments, management server 102 can host, maintain, or communicate with a set of associated resources including a configuration management database 104, which can be or include a local or remote database or data store hosting information related to a set of hosts 112, set of virtual machines 116, and/or other machines or nodes hosted in managed network 110. In embodiments, management server 102 can comprise, host, or access a package management tool 120 containing applications, logic, and/or other resources to initiate, configure, update, store, and manage a set of package versions 124. In aspects, each software package in set of package versions 124 can comprise a version of software such as an application, utility, gadget, script, operating system, and/or other software which can be developed in various versions over different development stages. The set of development stages can includes stages or phases such as "Beta," "Test", "Stable," "Quality Assurance (QA)," "Production," or others. In aspects, the package version for each stage can be stored or hosted in a corresponding repository in set of repositories 126, which can be or include one or more local or remote databases or other data stores. In aspects, programmers, developers, administrator, and/or other users can access or invoke package management tool 120 to access, test, code, update, review, and/or otherwise manipulate the software packages stored in set of repositories 126, for development, testing, distribution, and/or other purposes. In embodiments, access to management server 102 and related interfaces, storage, and other resources can be provided via a browser interface, or other interface, view, or channel. In embodiments, user access can be managed via credentials, such as user names, passwords, and/or other access management mechanisms.

Managed network 110 can include or host further resources including one or more set of virtual machines 116, such as, for instance, one or more sets of virtual clients, servers, targets, hosts, and/or other virtual machines, nodes, or resources. In aspects, one or more versions of set of package versions 124 can be directed, developed, or intended for installation to one or more virtual machines in one or more set of virtual machines 116. In embodiments, in addition to or instead of existing virtual machines, one or more versions of set of package versions 124 can be directed, developed, or intended for installation to one or more virtual machines in one or more set of newly instantiated virtual machines 134 which may not yet be instantiated or configured in managed network 110. In embodiments, the one or more virtual machine to which installation of one or more versions of set of package versions 124 is directed can be or include an appliance, which can in embodiments can be a special-purpose or specifically configured machine whose software resources, storage, processing, and/or other resources are installed or configured according to predetermined purposes or applications, such as, for instance, to perform as a transaction server. According to embodiments, hosts 112, a set of virtual machines 116, set of newly instantiated virtual machines 134, and/or other nodes, machines, or resources of managed network 110 can be or include virtual machines, as well as hardware-based or hardware-implemented machines, and can be or include resources instantiated from or based on cloud-based networks. According to embodiments, management server 102 can host not only package management tool 120 to organize and manage set of package versions 124, but also, can host additional logic including configuration management tool 122 to control, organize, and manage set of virtual machines 116, set of newly instantiated virtual machines 134, and resources related to set of package versions 124 intended for installation on those virtual machines.

More particularly, in terms of the overall management of software packages developed for distribution to set of virtual machines 116, set of newly instantiated virtual machines 134, and/or other virtual machines or nodes, and as shown in FIG. 1, configuration management tool 122 can communicate with configuration management database 104 to access and manipulate a set of configuration management profiles 132 that specify the configuration state of virtual machines in managed network 110. Set of configuration management profiles 132 can, for instance, store the specification of an operating system type and versions, processor allocation, memory allocation, storage, communications bandwidth, ports, or other resources, and/or other hardware, software, and/or other resources for one or more virtual machine. In aspects, set of configuration management profiles 132 can store individual virtual machine resource profiles that correspond to different versions of software packages in set of package versions 124. Thus, for instance, a first configuration management profile in set of configuration management profiles 132 can specify a virtual machine having "Operating System X," installed at "Version 1.2" with minimum memory of "2 gigabytes" as the minimum, baseline, required, or other target configuration for a software package version 1.0 stored as "Beta" stage in set of repositories 126. Similarly, a second configuration management profile in set of configuration management profiles 132 can specify a virtual machine having "Operating System X," installed at "Version 1.4" with minimum memory of "4 gigabytes" as the minimum, baseline, or required configuration for a software package version 1.1 stored as "Stable" stage in set of repositories 126. Other configuration types, parameters, values, and relationships, including versions in set of package versions 124, stages in set of repositories 126, can be used. However, in all cases because a software developer or other user can develop both a software package version, and the target, baseline, or required configuration profile for a virtual machine to which that version will be installed at the same time, via the same interface and/or a coordinated set of tools, compatibility, ease of use, debugging, and ease of distribution and installation of software packages are enhanced.

Figure 2:
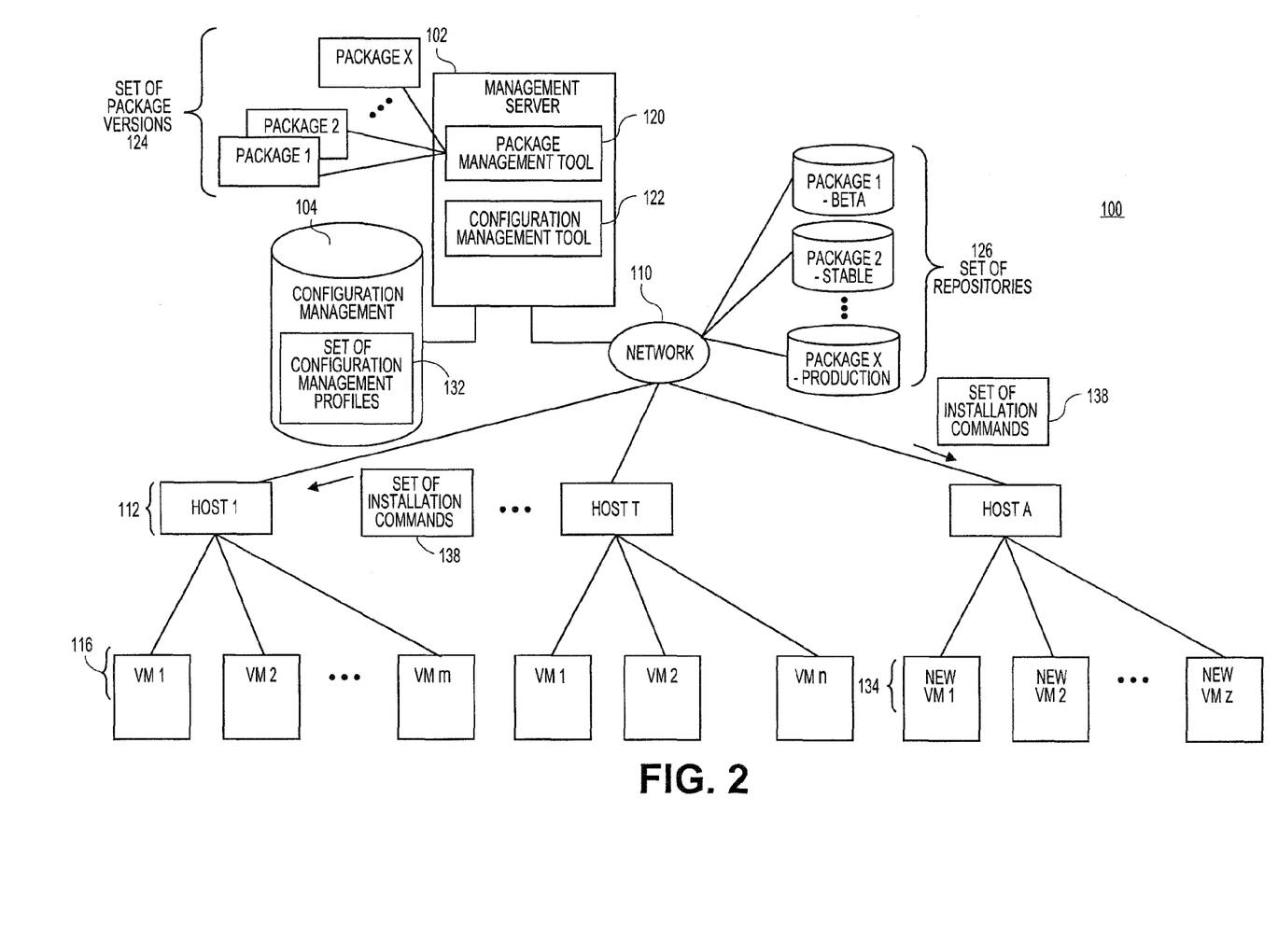
FIG. 2 illustrates an overall network in which systems and methods for integrated package development and machine configuration management can be implemented in further aspects, according to various embodiments.

More particularly, and as for instance as shown in FIG. 2, the set of package versions 124, set of configuration management profiles 132, and/or related code or resources can be freely exchanged, updated, modified, duplicated, and/or promoted or migrated between different development stages using management server 102 along with package management tool 120, configuration management tool 122, and/or related development resources. In embodiments, for instance, a given configuration management profile, such as a profile specifying the operating system, processor, memory, storage, and/or other resources for a target virtual machine to which a software package is intended to be installed, can be stored as "Configuration Management Profile Versions 1.2", and designated or associated with a specific package version, such as a Web browser application, package Version 2.4 which may for instance be stored to a repository designated "Stable" in set of repositories 126. A systems administrator, developer, or other user can, using management server 102 including package management tool 120 and/or configuration management tool 122, migrate, promote, or otherwise move Web browser application, package Version 2.4 to a repository designated "Production" in set of repositories 126 after debugging activities are complete. Conversely, a user can likewise use package management tool 120 and/or configuration management tool 122 to migrate, promote, or otherwise move or re-designate or re-associate a configuration management profile in set of configuration management profiles 132 to a new development stage, or to be associated with a package version occupying a different stage. In embodiments, configuration management profiles stored in set of configuration management profiles 132 can record a stage with which a virtual machine profile or template is associated. In embodiments, configuration management profiles stored in set of configuration management profiles 132 can record a software package version with while that profile is associated, thereby indirectly encoding a stage for the profile via its corresponding package. In embodiments, set of configuration management profiles 132 can also or instead be stored directly to set of repositories 126, or to other storage encoding or indicating development stages to which the configuration profile of a virtual machine may apply or which may be required for proper operation of a package. Thus, for example, a configuration management profile designated as "Testing" stage can be re-designated as the required or associated profile for a "Stable" stage, or other development stages or phases. A user can thereby specify both different configuration profiles of a virtual machine to receive and operate various software package versions at different stages of development, and freely move or migrate those versions of configuration profiles and packages between those stages.

After completion of a "Production" stage version of a software package or at other times, the developer, administrator, and/or other user can initiate the distribution and installation of a software package from set of repositories 126. Distribution and installation can, in aspects, take place on a manual basis specified by the user, and/or be initiated on an automatic basis, using for instance update logic or schedules. In embodiments, management server can transmit a set of installation commands 138 to one or more virtual machine in set of virtual machines 116, to one or more virtual machine in set of newly instantiated virtual machines 134, and/or other virtual machines or resources, to cause installation to be initiated using the configuration management profile and/or software package version selected or stored in set of repositories 126.

Figure 3:
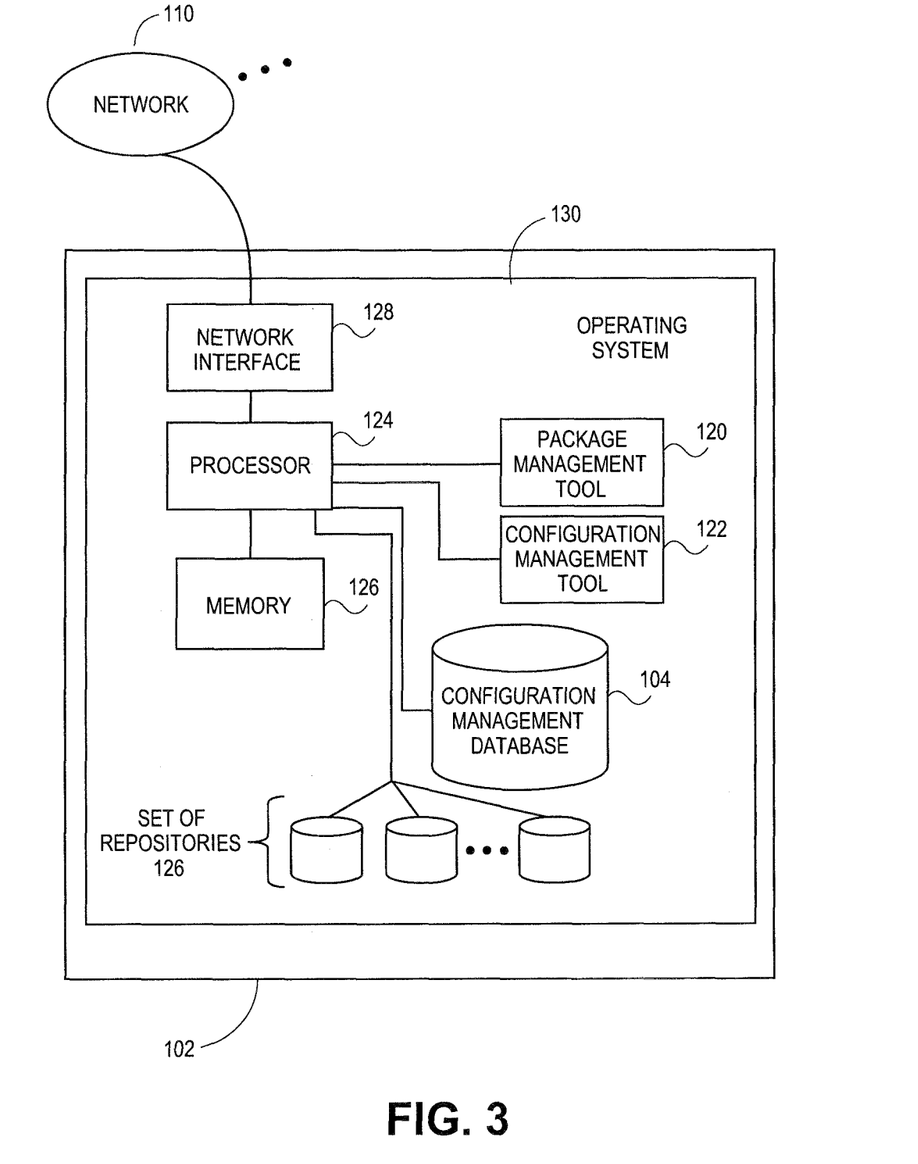
FIG. 3 illustrates exemplary hardware, software, and other resources that can be used in a management server which can support systems and methods for integrated package development and machine configuration management, according to various embodiments.

FIG. 3 illustrates an exemplary diagram of hardware and other resources that can be incorporated in a management server 102 configured to communicate with managed network 110 including set of virtual machines 116, set of newly instantiated virtual machines 134, set of repositories 126, set of hosts 112, and/or other resources, according to embodiments. In embodiments as shown, the management server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with configuration management database 104, such as a database stored on a local or remote hard drive or other storage. Processor 124 further communicates with network interface 128, such as an Ethernet or wireless data connection, which in turn communicates with one or more managed network 110, which can be, include, or be accessed with via private or secure channels, and/or the Internet or other public or private networks. Processor 124 also communicates with package management tool 120, configuration management tool 122, and/or other resources or logic, to execute software package coding, testing, distribution, and/or installation, as well as integrated virtual machine management including configuration management, and/or other control, configuration, development, messaging, and other management processes described herein. Other configurations of the management server 102, associated network connections, and other hardware and software resources are possible. While FIG. 3 illustrates management server 102 as a standalone system comprises a combination of hardware and software, management server 102 can also be implemented as a software application or program capable of being executed by a conventional computer platform. Likewise, management server 102 can also be implemented as a software module or program module capable of being incorporated in other software applications and programs. In either case, management server 102 can be implemented in any type of conventional proprietary or open-source computer software, code, logic, or language.

Figure 4:
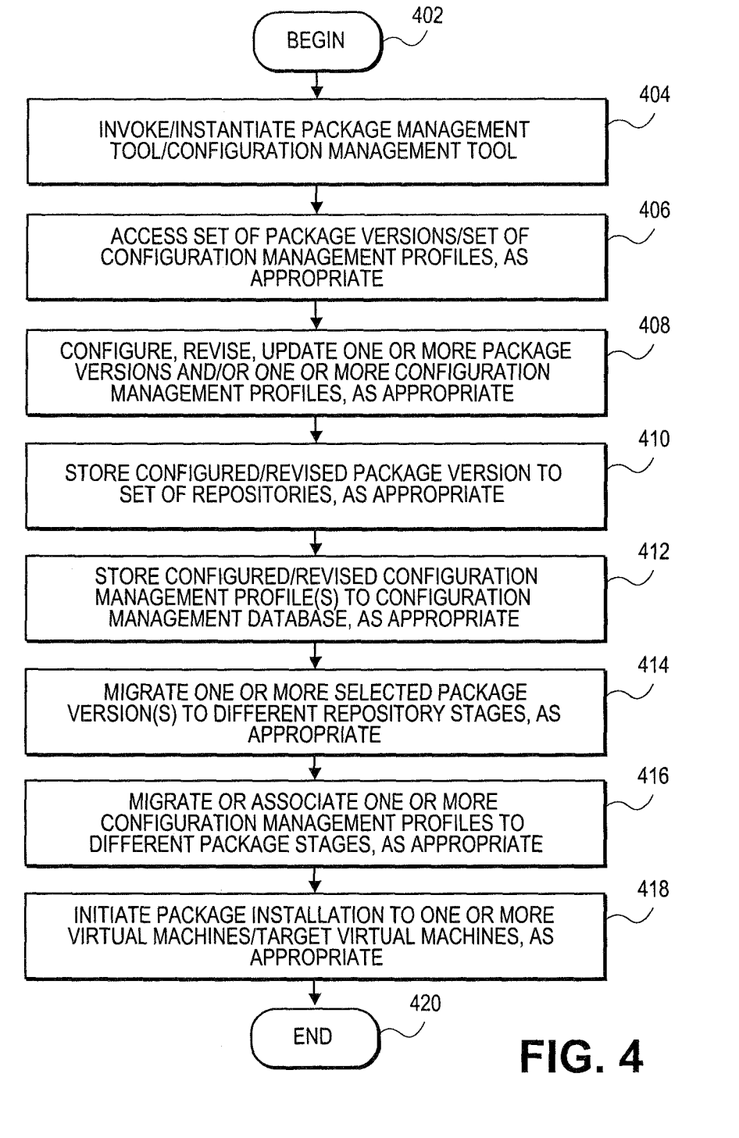
FIG. 4 illustrates a flowchart of package management and configuration management processing, according to various embodiments.

FIG. 4 illustrates a flowchart of overall processing that can be used in systems and methods for integrated package development and machine configuration management, according to various embodiments. In 402, processing can begin. In 404, a developer, systems administrator, or other user can invoke, access, and/or instantiate package management tool 120 and/or configuration management tool 122, hosted by management server 102, as appropriate. In 406, a developer, systems administrator, or other user can access set of package versions 124 and/or set of configuration management profiles 134, as appropriate, via package management tool 120 or configuration management tool 122, respectively. In 408, the user can configure, revise, and/or update one or more package versions in set of package versions 124, and/or configure, revise, and/or update one or more configuration management profiles in set of configuration management profiles 124, as appropriate. For instance, a user can update a browser application and/or related resources, to create a new version of that software package. Similarly, a user can in addition or instead configure or update a virtual machine configuration profile, and create a new profile version to correspond to the updated browser, or other package versions of that or other software.

In 410, any newly configured and/or revised package version can be stored to set of repositories 126, as appropriate. The subject package version can be stored, for instance, to a new or revised stage in set of repositories, such as "Quality Assurance" or other stage designations. In 412, any newly configured and/or revised configuration management profile can be stored to set of configuration management profiles 124, for instance, to reflect or encode the minimum or required set of resources for a virtual machine capable of hosting a browser software package registered to the "Quality Assurance" stage. In 414, one or more selected configuration management profile(s) can be migrated to or associated with a new or different repository stage. For example, a user can move a configuration management profile, such as "Version 1.2" for a server virtual machine template or profile, from a stage designated as "Quality Assurance" to a stage designated as "Production" in set of configuration management profiles 132, or change a designation in set of configuration management profiles 132 to indicate the configuration management profile is associated with a package version itself stored to those stages. In 416, one or more selected package version(s) can be migrated to or associated with a new or different repository stage. For example, a user can move a software package version, such as Version 4.4 of a messaging application, from a stage designated as "Beta" to a stage designated as "Stable" in set of repositories 126. In embodiments, changes to the stage assignment of package versions and changes to the stage assignment of configuration management profiles can be made together in coordinated fashion and/or at the same time, or can be made independently and/or at different times. In embodiments, a configuration management profile can be assigned to more than one stage and/or more than one package version or package type.

In 418, installation of one or more software packages can be initiated from set of repositories 126, for instance, by set of installation commands 138 initiated by user selection and/or automatic update. In embodiments, installation can be performed to one or more virtual machines in existing set of virtual machines 116. In embodiments, installation can in addition or instead be performed to one or more newly instantiated machines in a set of newly instantiated virtual machines 134. Other virtual machines, or in cases, physical or non-virtual machines, can likewise receive set of installation commands 138 and associated software package installation and/or virtual machine configuration. In 420, processing can repeat, return to a prior processing point, jump to a further processing point, or end.

The foregoing description is illustrative, and variations in configuration and implementation may occur to persons skilled in the art. For example, while embodiments have been described in which a single management server 102 hosts package management tool 120, configuration management tool 122, and other resources, in embodiments, package management logic, configuration management logic, and other logic, rules, or resources can be hosted in separate or remote servers or other sites, hardware, or resources. For further example, again while embodiments have been described in which package management tool 120 and configuration management tool 122 comprise separate software, engines, or logic, in embodiments those tools, along with other software or logic, can be combined. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
storing, by a management server comprising a processor, a plurality of software package versions, each software package version assigned to one development stage;
for each software package version of the plurality of software package versions, storing, by the management server, the software package version to a repository in a plurality of repositories corresponding to the development stage assigned to the software package version;
for each development stage assigned to the plurality of software package versions, storing, by the management server, a configuration management profile for a target virtual machine, the configuration management profile comprising an operating system type of the target virtual machine, an operating system version of the target virtual machine, a processor allocation, and a memory allocation of the target virtual machine; and
providing access to at least one software package version of the plurality of software package versions.

2. The method of claim 1, wherein the plurality of software package versions comprises at least one of a testing stage software version, a stable stage software version, a quality assurance stage software version, or a production stage software version.

3. The method of claim 1, wherein the plurality of software package versions comprises at least one of a plurality of application software package versions or a plurality of operating system software versions.

4. The method of claim 1, further comprising distributing at least one installable version to a plurality of installation virtual machines based on a plurality of installation virtual machines conforming to the configuration management profile of the target virtual machine.

5. The method of claim 1, wherein the plurality of software package versions are migratable between the plurality of development stages.

6. The method of claim 1, wherein each configuration management profile is migratable between the plurality of development stages.

7. The method of claim 6, wherein the target virtual machine is migratable between the plurality of development stages without requiring reinstallation of resources specified by the configuration management profile.

8. The method of claim 1, wherein the plurality of repositories comprises a plurality of network-accessible databases to store software package versions assigned to the plurality of development stages.

9. The method of claim 1, wherein duplicate versions of a plurality of staged software package versions are stored as one file.

10. The method of claim 1, further comprising mirroring the plurality of repositories to a backup storage site.

11. A system, comprising:
a first interface to a plurality of repositories to store a plurality of software package versions, each software package version assigned to one development stage, each software package version of the plurality of software package versions is stored in a repository corresponding to the development stage assigned to the software package version;
a second interface to a configuration management database to store a configuration management profile for a target virtual machine for each development stage assigned to the plurality of software package versions, the configuration management profile comprising an operating system type of the target virtual machine, an operating system version of the target virtual machine, a processor allocation, and a memory allocation of the target virtual machine; and
a processor, to communicate with the set of repositories via the first interface and the configuration management database via the second interface, the processor to provide access to at least one version of the set of software package versions via a network.

12. The system of claim 11, wherein the plurality of software package versions comprises at least one of a testing stage software version, a stable stage software version, a quality assurance stage software version, or a production stage software version.

13. The system of claim 11, wherein the plurality of software package versions comprises at least one of a plurality of application software package version or a plurality of operating system software versions.

14. The system of claim 11, further comprising distributing at least one installable version to a set of installation virtual machines based on the set of installation virtual machines conforming to the configuration management profile of the target virtual machine.

15. The system of claim 11, wherein the plurality of software package versions are migratable between the plurality of development stages.

16. The system of claim 11, wherein each configuration management profile is migratable between the plurality of development stages.

17. The system of claim 16, wherein the target virtual machine is migratable between the plurality of development stages without requiring reinstallation of resources specified by the configuration management profile.

18. The system of claim 11, wherein the plurality of repositories comprises a plurality of network-accessible databases to store software package versions assigned to the plurality of development stages.

19. The system of claim 11, wherein duplicate versions of a plurality of staged software package versions are stored as one file.

20. The system of claim 11, wherein the processor is further to minor the plurality of repositories to a backup storage site.

* * * * *

UNITED STATES PATENT AND TRADEMARK OFFICE
CERTIFICATE OF CORRECTION

PATENT NO. : 8,719,782 B2  
APPLICATION NO. : 12/608566  
DATED : May 6, 2014  
INVENTOR(S) : Michael Paul DeHaan Page 1 of 1

It is certified that error appears in the above-identified patent and that said Letters Patent is hereby corrected as shown below:

In the claims

In claim 20, column 9, line 16 delete "minor" and insert --mirror--

Signed and Sealed this
Twenty-seventh Day of October, 2015

Michelle K. Lee
*Director of the United States Patent and Trademark Office*